(12) United States Patent
Chen et al.

(10) Patent No.: US 12,373,639 B2
(45) Date of Patent: Jul. 29, 2025

(54) SYSTEM FOR JUDGING INPUT MODE OF FORM DATA

(71) Applicants: Inventec (Pudong) Technology Corporation, Shanghai (CN); INVENTEC CORPORATION, Taipei (TW)

(72) Inventors: Wei-Chao Chen, Taipei (TW); Ming-Chi Chang, Taipei (TW); Ghih-Pin Wei, Taipei (TW); Jing-Lun Huang, Taipei (TW); Siang-Yu Lan, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 182 days.

(21) Appl. No.: 18/465,480

(22) Filed: Sep. 12, 2023

(65) Prior Publication Data

US 2024/0419892 A1 Dec. 19, 2024

(30) Foreign Application Priority Data

Jun. 19, 2023 (CN) .......................... 202310728314.2

(51) Int. Cl.
G06F 40/174 (2020.01)
G06F 40/226 (2020.01)

(52) U.S. Cl.
CPC .......... G06F 40/174 (2020.01); G06F 40/226 (2020.01)

(58) Field of Classification Search
CPC .... G06F 40/174; G06F 40/226; G06F 3/0237; G06N 3/09; G06N 5/01; G06N 20/00
See application file for complete search history.

(56) References Cited

U.S. PATENT DOCUMENTS

| | | | | |
|---|---|---|---|---|
| 2016/0267396 | A1* | 9/2016 | Gray | G06N 20/00 |
| 2018/0248905 | A1* | 8/2018 | Côté | G06N 3/08 |
| 2021/0117417 | A1* | 4/2021 | Hendrickson | G06F 16/90 |
| 2024/0177524 | A1* | 5/2024 | Iyengar | G10L 15/1815 |

* cited by examiner

Primary Examiner — Asher D Kells
(74) Attorney, Agent, or Firm — MUNCY, GEISSLER, OLDS & LOWE, P.C.

(57) ABSTRACT

A system for judging input mode of form data is configured to extract a study-use field information and a study-use volume of time stamp from each form data having a ground truth of being manually input or automatically input to accordingly execute a learning calculation to generate a judgment calculation model, further to extract an under-judged field information and an under-judged volume of time stamp from each under-judged form data without the ground truth to accordingly generate a judgment result for predicting that the under-judged form data is manually input or automatically input, and further to define judgment-abnormal form data and a trace back ground truth to re-execute the learning calculation for revising the judgment calculation model when the judgment result does not comply with a feedback ground truth.

10 Claims, 1 Drawing Sheet

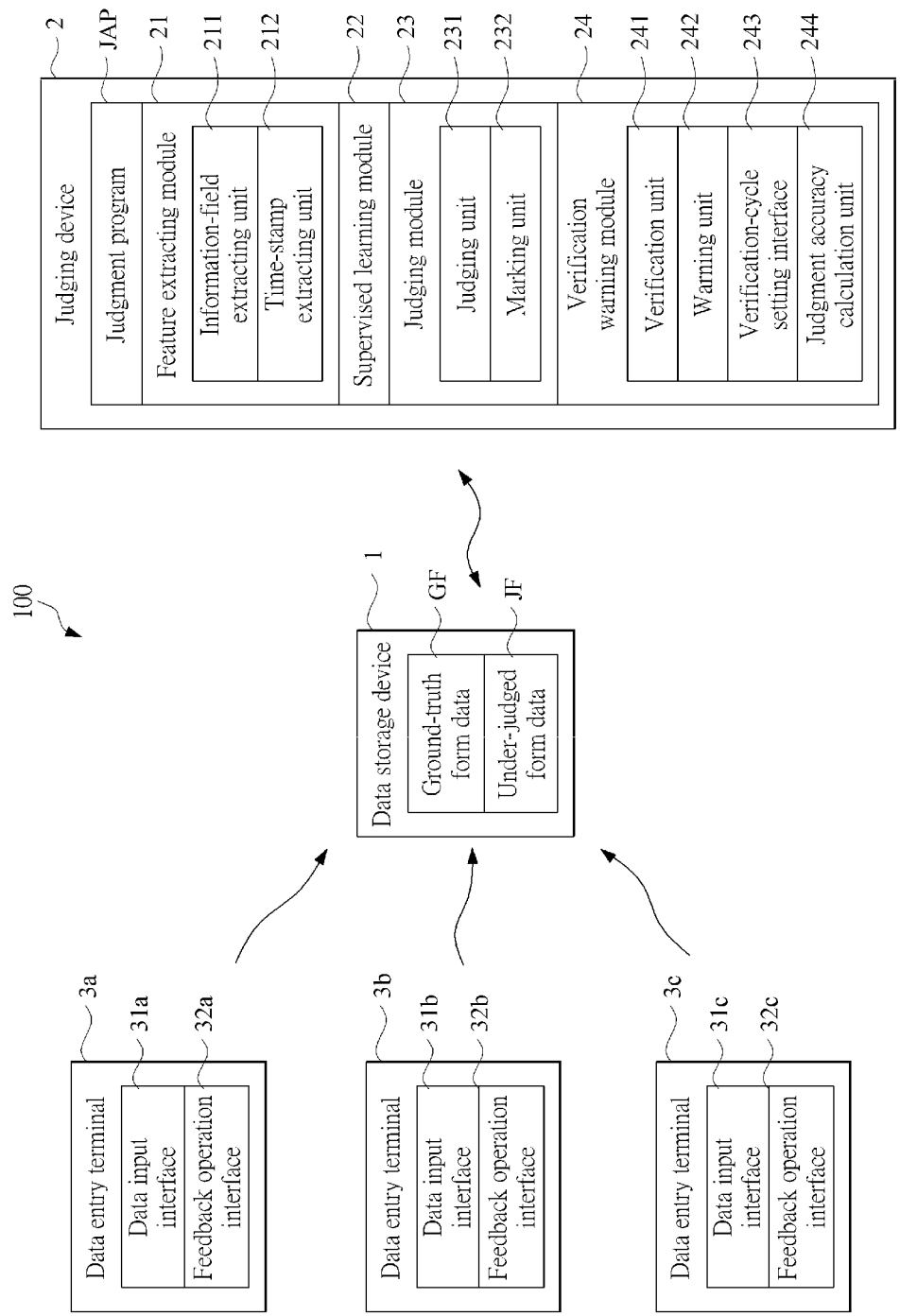

SYSTEM FOR JUDGING INPUT MODE OF FORM DATA

This application claims the benefit of China Patent Application Serial No. 202310728314.2 (CN), filed Jun. 19, 2023, the subject matter of which is incorporated herein by reference.

BACKGROUND OF THE INVENTION

(1) Field of the Invention

The invention relates to a judgment system, and more particularly to a judgment system that can be used to determine whether a form-data input is manually input or automatically input.

(2) Description of the Prior Art

In response to needs of organizational management, system management and information integration management, more and more form data needs to be transmitted to a corresponding data storage device (or, a server) in a data management center for centralized management as a data base for performing analysis upon specific subjects. However, part of these form data are generated through various manual input methods such as typing, option clicking or handwriting with image recognition technology, while some other part thereof are generated through automatic input methods such as barcode reading, chip sensing, label sensing, image identifying and input from systems themselves.

In order to accurately interpret and analyze meaning presented by the form data, it is necessary to conduct precise statistical analysis through big data calculations. Practically, a premise of this approach is that contents of the form data itself shall present extremely high accuracy, so as not to misjudge the true meaning provided by the form data. However, the error rate of inputting data through the manual input method such as typing, writing or clicking is often much higher than that of inputting data through the automatic input method such as barcode reading, chip sensing, label sensing, image recognizing or automatic system import.

Due to the huge amount of form data, it is quite impractical for the staff of the data management center to check and confirm one by one whether or not the content of the form data is correct. Practically, checking and confirming of the form data one by one can only be achieved by utilizing auxiliary inspection tool software. Even so, due to the high diversity of the form data, it is impossible to develop corresponding inspection tool software for specific form data to perform the inspection one by one.

If the form data can be automatically generated, the workload upon the staff in the data management center would be greatly reduced. Therefore, it is imperative to promote the work of automatic input of the form data. However, in response to various usage scenarios and requirements, it is impossible for all the form data to be converted and thus generated automatically in a short period of time. It is quite possible and inevitable that part of the form data need to be manually input.

Since the form data stored in the data storage device (or, the server) of the data management center is mixed with automatic-input data and manual-input data, it is really necessary to develop a new judgment technology to determine which form data is generated by automatic input and which is generated by manual input. Thereupon, more inspection resources can be devoted to inspecting the form data generated by manually inputting, such that the overall accuracy of the form data can be substantially improved.

SUMMARY OF THE INVENTION

In view that none of judgment techniques is specifically provided in the art to determine whether or not individual form data is generated by manually or automatically inputting, and since it is also impossible to concentrate major inspection resources to verify the manual-input form data, thus the accuracy of the entire form data is now difficult to improve. Accordingly, it is an object of the present invention to provide a system for judging input mode of form data ("judgment system" hereinafter) that includes a data storage device and a judging device.

The data storage device is stored with a plurality of ground-truth form data and a plurality of under-judged form data. The plurality of ground-truth form data have correspondingly a plurality of initial ground truths for defining individually manual inputs or automatic inputs. The judging device, communicatively connected with the data storage device for retrieving the plurality of ground-truth form data and the plurality of under-judged form data, is furnished with a judgment program. The judgment program is executed to create a feature extracting module, a supervised learning module, a judging module and a verification warning module.

The feature extracting module is configured to retrieve a study-use field information and a study-use volume of time stamp corresponding to data chaos from each of the plurality of ground-truth form data, and to retrieve an under-judged field information and an under-judged volume of time stamp corresponding to the data chaos from each of the plurality of under-judged form data. Thus, the plurality of ground-truth form data have correspondingly a plurality of the study-use field information and a plurality of the study-use volumes of time stamp.

The supervised learning module is configured to perform a learning calculation for generating a judgment calculation model according to the plurality of study-use field information and the plurality of study-use volumes of time stamp corresponding to the plurality of ground-truth form data and one of the plurality of initial ground truths.

The judging module is configured to judge each of the plurality of under-judged form data for generating correspondingly a judgment result for predicting whether the each of the plurality of under-judged form data is the manual input or the automatic input according to the under-judged field information and the under-judged volume of time stamp corresponding to the judgment calculation model and each of the plurality of under-judged form data. Thus, a plurality of the judgment results are generated.

The verification warning module is configured to receive a plurality of feedback ground truths for defining individually the plurality of under-judged form data to be the manual inputs or the automatic inputs. When one of the plurality of judgment results does not match one of the plurality of feedback ground truths in verifying one of the plurality of under-judged form data, a warning message is generated for defining a judgment-abnormal form data and a trace-back ground truth, the judgment-abnormal form data and the trace-back ground truth are stored into the data storage device as one of the plurality of ground-truth form data and one of the plurality of initial ground truths, respectively, for the supervised learning module to re-execute the learning calculation and accordingly revise the judgment calculation model.

In one embodiment of this present invention, the judgment system further includes a plurality of data entry terminals. The plurality of ground-truth form data and the plurality of under-judged form data are transmitted to the data storage device by the plurality of data entry terminals. Preferably, the data storage device can be a data storage server, and the judging device can be a computing server. Each of the plurality of data entry terminals further includes a feedback operation interface for an operator of each of the plurality of data entry terminals to input one of the plurality of feedback ground truths upon when one of the plurality of judgment results corresponding to one of the plurality of under-judged form data is verified to be false.

Preferably, the verification warning module further includes a verification-cycle setting interface for setting a verification cycle, the judgment-abnormal form data and the corresponding trace-back ground truth are periodically defined as one of the plurality of ground-truth form data and one of the plurality of initial ground truths, respectively, according to the verification cycle, for the supervised learning module to periodically perform the learning calculation according to the verification cycle.

The feature extracting module further includes an information-field extracting unit, the information-field extracting unit utilizes a field entropy algorithm to calculate the study-use field information and the under-judged field information, the field entropy algorithm is $-\Sigma_{i-1}^{k} p_i \log p_i$, $p_i = (a_i)/(\Sigma_{i=1}^{k} a_i)$, k stands for a number of data field types, $a_i$ stands for the i-th data field type among the k data field types, and i, k and $a_i$ are all natural numbers.

The feature extracting module further includes a time-stamp extracting unit for an operator, the time-stamp extracting unit is configured for an operator to indicate q time-stamp fields among p fields and to retrieve the study-use volume of time stamp and the under-judged volume of time stamp according to a time-stamp-volume algorithm, the time-stamp-volume algorithm is $Max_{1 \leq j \leq q}(v_j)$, $v_j$ stands for a number of different data content types included in r data columns corresponding to the j-th time-stamp field among the q time-stamp fields, j, $v_j$, p, q and r are all natural numbers, and p>q.

The judging module further can include a marking unit, the marking unit gives an automatic-input stamp or a manual-input stamp to each of the plurality of under-judged form data according to the corresponding judgment result, and the automatic-input stamp or the manual-input stamp is stored into the data storage device.

In addition, regarding the learning calculation, preferably, the learning calculation executed by the supervised learning module can include at least one basic training algorithm and at least one fitting algorithm, the at least one basic training algorithm includes at least of a K nearest neighbors algorithm (KNN), a support vector machine (SVM) algorithm, a decision tree algorithm and a regression algorithm, and the at least one fitting algorithm includes at least a random forest algorithm and an extreme gradient boosting (XGBoost) algorithm.

As stated, in the system for judging input mode of form data provided by the present invention, through long-term observations upon the relevance and regularity between the manual-input form data and the automatic-input form data, the amount of field information and the volume of time stamps related to the time and the data chaos are particularly selected as the important feature basis for subsequent learning, training and judging. Accordingly, the supervised learning and training are used to establish the judgment calculation model with a high level of confidence in a short period of time, and to obtain the judgment results with higher judgment accuracy.

Further, by using the judging device to perform periodically judgment, verification, warn and generation of the basic truth, the false judgment results can be corrected to accordingly re-execute the learning calculation so as to revise the judgment calculation model. Thereupon, advantages of automatic judging and input can be obtained, and also the judgment accuracy can be significantly improved in a short period of time. After obtaining the judgment results with a further high judgment accuracy rate, majority of examination resources (including personnel, equipment and/or tool software, etc.) can thus concentrate the verification upon the manual-input form data, such that the entire accuracy of the form data can be effectively improved.

All these objects are achieved by the system for judging input mode of form data described below.

BRIEF DESCRIPTION OF THE DRAWINGS

The present invention will now be specified with reference to its preferred embodiment illustrated in the drawings, in which:

The sole FIGURE is a schematic block view of a preferred embodiment of the system for judging input mode of form data in accordance with this disclosure.

DESCRIPTION OF THE PREFERRED EMBODIMENT

The invention disclosed herein is directed to a system for judging input mode of form data. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the system for judging input mode of form data provided by the present invention can be widely used in judging whether or not the form data is generated by manually inputting or automatically inputting, the accompanying application level is quite broad. To avoid repeated descriptions across different embodiments, here only one preferred embodiment is listed for specific description. In particular, this preferred embodiment is simply used for conveniently and clearly explaining the purpose and effect of various embodiments in accordance with the present invention.

Referring to the sole figure, a schematic block view of a preferred embodiment of the system for judging input mode of form data (i.e., the judgment system) in accordance with this disclosure is shown. In this embodiment, the judgment system 100 includes a data storage device 1, a judging device 2 and a plurality of data entry terminals (three 3a~3c shown in the figure).

The data storage device 1 can be a data storage server. The judging device 2 can be a computing server. Each of the data entry terminals 3a~3c can be a built-in computer of work equipment, an industrial computer, a desktop computer, a notebook computer, a tablet computer or any terminal device that can receive form-data input from a smart phone. The data entry terminals 3a~3c are individually furnished with data input interfaces 31a~31c and feedback operation interfaces 32a~32c, respectively. Each of the data input interfaces 31a~31 and the corresponding feedback operation interfaces 32a~32 can be program operation pages after the respective data entry terminal 3a, 3b or 3c performs a specific program, or network operation page presented on the respective data entry terminal 3a, 3b or 3c after being connected to a network server.

The data storage device 1 is stored with a plurality of ground-truth form data GF and a plurality of under-judged form data JF. After being input through at least one at data input interface 31a~31c utilized by at least one operator of the corresponding data entry terminal 3a~3c, the ground-truth form data GF and the under-judged form data JF would be transmitted to the data storage device 1 for storage. The ground-truth form data GF are corresponded to a plurality of initial ground truths defined as automatic inputs (i.e., the form data generated through automatic data input) or manual inputs (i.e., the form data generated through manual data input). In this embodiment, the so-called initial ground truth is directed to a fact that has been proven to have a high degree of credibility, before the judgment system 100 is introduced to judge the corresponding under-judged form data JF. On the other hand, the under-judged form data JF is directed to the form data that is yet to be determined as a manual input or an automatic input by the judgment system 100.

For example, as shown in Form 1, the data storage device 1 is stored with 10 ground-truth form data, corresponding to serial numbers 0001~0010. Initial ground truths corresponding to the ground-truth form data with serial numbers 0001~0005 are manual inputs (i.e., those data input from text recognition software through typing, clicking or handwriting). In order to be recognized or read conveniently by people or software, an "M" mark is assigned to each of the ground-truth form data with serial numbers 0001~0005 to symbolize that the corresponding form data is the manual input. In Form 1, the rest eight of the initial ground truths of the corresponding ground-truth form data are the automatic inputs. Namely, these form data are all automatically input through barcode reading, chip sensing, tag sensing, image recognizing or inputting by the system itself. Similarly, an "A" mark is assigned to each of the ground-truth form data corresponding to the automatic inputs.

| Form 1: Listing of ground-truth form data | | |
|---|---|---|
| Serial No. of ground-truth form data | Initial ground truth | Mark |
| 0001 | Manual input | M |
| 0002 | Automatic input | A |
| 0003 | Automatic input | A |
| 0004 | Automatic input | A |
| 0005 | Manual input | M |
| 0006 | Automatic input | A |
| 0007 | Automatic input | A |
| 0008 | Automatic input | A |
| 0009 | Automatic input | A |
| 0010 | Automatic input | A |

The judging device 2 is communicatively connected with the data storage device 1 to retrieve the ground-truth form data GF and the under-judged form data JF. The judging device 2 is furnished with a judgment program JAP. After the judgment program JAP is executed, a feature extracting module 21, a supervised learning module 22, a judging module 23 and a verification warning module 24 would be created.

After a long-term observation, it is found that following relevance and regularity generally exist between the form data of the automatic input and that of the manual input. They are:

1. Since the automatic input can provide a huge amount of data in a short time, thus those data, huge but input in a short time, are usually the automatic input;
2. Those data with high similarity or high duplication are usually the automatic inputs, but those data with high dissimilarity or low repeatability are usually the manual inputs;
3. Since the form data is input according to the field, there is a regularity that thus column data in the same field usually have the same type of attributes (such as time, text and numbers, etc.); and
4. Similarity, dissimilarity and repeatability of the data can be reflected by parameters or indicators related to the corresponding data chaos.

According to various relevances obtained through long-term observations and inductions, in order to improve the judgment of the judging device 2, priority should be given to extracting parameters or indicators related to time and data chaos as the basis for learning/training and subsequent judgments. Under the foregoing premise, the feature extracting module 21 includes an information-field extracting unit 211 and a time-stamp extracting unit 212.

In the learning stage, the information-field extracting unit 211 can retrieve individual study-use field information corresponding to the data chaos from each of the ground-truth form data GF, and then retrieve the under-judged field information corresponding to the data chaos from the under-judged form data JF upon when the determination of the manual input or the automatic input for each of the under-judged form data JF is made (i.e., the judging stage).

The information-field extracting unit 212 can apply a field entropy algorithm to obtain the study-use field information and the under-judged field information. The field entropy algorithm can be $-\Sigma_{i=1}^{k} p_i \log p_i$, in which $p_i=(a_i)/(\Sigma_{i=1}^{k} a_i)$, k stands for the number of data field types to tell that k types of the data field are included, $a_i$ stands for the $i^{th}$ types of the data field among the k types of the data field, and i, k and $a_i$ are all natural numbers. Since the field entropy algorithm is a logarithmic function of a probability, thus the probability is always less than 1, the result of taking the logarithm of a value less than 1 would be a negative value, and so a negative sign must be added to restore back to a positive value.

Except for the aforesaid field entropy algorithm, the information-field extracting unit 212 can retrieve other parameters related also to the data chaos. For example, the data repeatability (the number of fields, or the total number or proportion of data with the same information) or data similarity (the proportion of the same part of the data contents) can be used as the study-use field information or the under-judged field information.

The time-stamp extracting unit 212 can provide a time-stamp indicating interface (not shown in the figure) for a user to indicate q time-stamp fields within p fields. In addition, the time-stamp extracting unit 212 would apply a time-stamp-volume algorithm to retrieve the study-use volume of time stamp in the learning stage, and, in the judging stage, the same time-stamp-volume algorithm is applied to retrieve the under-judged volume of time stamp. In this embodiment, the time-stamp-volume algorithm can be $Max_{1 \leq j \leq q}(v_j)$, in which $v_j$ stands for the number of different data content types included in r data columns corresponding to the $j^{th}$ time-stamp field among q time-stamp fields, j, $v_j$, p, q and r are all natural numbers, and p>q.

Though data contents of the time-stamp fields may not interpret directly to the time itself, yet they are preferably related to the time, such as the serial numbers or codes corresponding to the time sequences. In this embodiment, the time-stamp-volume algorithm is to obtain the maximum of the number of different data content types within all the time-stamp fields. However, in practical applications, the arithmetic mean, median or mode of the number of different data content types of all the time-stamp fields can be used as the time-stamp-volume.

Regarding the extraction of field information (for learning or judging), for example, as shown in Form 2, a form data may include 6 fields including sales date, brand, model, quantity, unit price and sales amount. The sales date belongs to the time field, the brand and model belong to the text field, and the quantity, the unit price and the sales amount belong to the number field. Obviously, there are a total of 3 fields: the time field, the text field and the number field, which means that the above k is 3; the number of the time field is 1, which means that $a_1$ is represented by 1; the number of the text field is 2, which means that $a_2$ is represented by 2; and, the number of the number field is 3, which means that $a_3$ is represented by 3.

Possibility of the $1^{st}$ field (the time field), $p_1=(a_1)/(\Sigma_{i=1}^3 a_1)$, is equal to 1/6;
Possibility of the $2^{nd}$ field (the text field), $p_2=(a_2)/(\Sigma_{i=1}^3 a_1)$, is equal to 2/6; and,
Possibility of the $3^{rd}$ field (the number field), $p_3=(a_3)/(\Sigma_{i=1}^3 a_1)$, is equal to 3/6.

By applying the field entropy algorithm $-\Sigma_{i=1}^k p_i \log p_i$, a field information of 0.4392473 can be obtained. In the case that the form data is the aforesaid ground-truth form data GF, then 0.4392473 is the study-use field information. In the case that the form data is the aforesaid under-judged form data JF, 0.4392473 is the under-judged field information.

Regarding the retrieving or extracting the time-stamp volume (for learning or judging), for example, as shown in Form 2, 6 fields are included to represent that P is equal to 6. These 6 fields are only related to the sales date and time, and thus the user can apply the time-stamp extracting unit 212 to provide a time-stamp indicating interface (not shown in the figure) to indicate that the sales-date field is the time-stamp field; i.e., q=1. In Form 2, the time-stamp field (the sales-date field) includes 14 data columns; i.e., r=14. In the time-stamp field (the sales-date field), 14 data but only three different data contents are included; i.e., March $26^{th}$, March $27^{th}$ and March $28^{th}$. The number of different data content types is 3; i.e., $v_j=3$. For the simple one time-stamp field, q=1, and thus $Max_{1 \leq j \leq q}(v_j)=3$. It implies that the time-stamp-volume is 3. In the case that the form data is the aforesaid ground-truth form data GF, then the study-use volume of time stamp is equal to 3. In the case that the form data is the aforesaid under-judged form data JF, then the under-judged volume of time stamp is equal to 3.

Form 2: Form data

| Sales date | Brand | Model | Q'ty | Unit price | Sales amount |
|---|---|---|---|---|---|
| March $26^{th}$ | Brand A | G655 | 47 | 1280 | 60160 |
| March $26^{th}$ | Brand B | E222 | 87 | 1100 | 95700 |
| March $26^{th}$ | Brand C | V990 | 35 | 880 | 30800 |
| March $26^{th}$ | Brand D | R448 | 25 | 1430 | 35750 |
| March $26^{th}$ | Brand B | E224 | 72 | 1077 | 77544 |
| March $27^{th}$ | Brand B | E222 | 67 | 1100 | 73700 |

-continued

Form 2: Form data

| Sales date | Brand | Model | Q'ty | Unit price | Sales amount |
|---|---|---|---|---|---|
| March $27^{th}$ | Brand A | G655 | 90 | 1280 | 115200 |
| March $27^{th}$ | Brand A | G900 | 18 | 880 | 15840 |
| March $27^{th}$ | Brand C | V980 | 42 | 999 | 41958 |
| March $28^{th}$ | Brand B | E224 | 24 | 1077 | 25848 |
| March $28^{th}$ | Brand D | U922 | 25 | 889 | 22225 |
| March $28^{th}$ | Brand C | V980 | 33 | 999 | 32967 |
| March $28^{th}$ | Brand C | V350 | 72 | 1372 | 98784 |
| March $28^{th}$ | Brand D | R448 | 36 | 1430 | 51480 |

Although, in the above example, the 6 fields including the sales date, brand, model, quantity, unit price and sales amount are 6 fields arranged horizontally, yet, in practice, the above fields may also be arranged vertically. When the fields are arranged vertically, the above-mentioned r data columns (horizontally arranged) can be replaced by r data rows (vertically arranged), and the feature-extracting method (for learning or judging) can include retrieving or extracting of the field information and the time-stamp volume can be similar to the above description, except that the vertical data are rearranged into a horizontal format. As such, details thereabout would be omitted herein.

The supervised learning module 22 can perform a learning calculation to generate a judgment calculation model according to the study-use field information and the study-use volumes of the time stamps corresponding to the ground-truth form data GF and the initial ground truths (can be symbolized by the automatic-input stamp A or the manual-input stamp M). Regarding the learning calculation, preferably, the learning calculation can include at least one basic training algorithm, and the basic training algorithm includes at least one of a K nearest neighbors (KNN) algorithm, a support vector machine (SVM) algorithm, a decision tree algorithm and regression algorithm. Further preferably, beside the basic training algorithm, the learning calculation can further include at least one fitting algorithm, and the fitting algorithm can include at least one of a random forest algorithm and an extreme gradient boosting (XG-Boost). The judgment calculation model is directed to a mathematical calculus model established by automatic derivation through performing the aforesaid learning calculation.

Since the above-mentioned learning calculation technology (including the basic training algorithm and the fitting algorithm) is already a fairly mature calculation technology at present, anyone with common knowledge in this field can use the above-mentioned algorithm or a combination thereof to construct the above-mentioned judgment calculation model, which will not be described further in detail below.

The judging module 23 can include a judging unit 231 and a marking unit 232. According to the judgment calculation model and the under-judged field information and the under-judged volume of time stamp of each of the under-judged form data, the judging unit 231 would judge each of the under-judged form data to generate correspondingly a judgment result for predicting whether the each of the under-judged form data JF is a manual input or an automatic input, and further a plurality of judgment results can be generated. After giving each of the under-judged form data an automatic-input stamp A or a manual-input stamp M according to the corresponding judgment result, the marking unit 232 would further stores the judgment results into the data storage device 1.

To speak concisely, the judgment calculation model is used in the learning stage to learn and train how to derive the initial ground truths (can be symbolized by the automatic-input stamps A or the manual-input stamps M) according to the study-use field information and the study-use volumes of the time stamps, so as in the judging stage to derive and predict the corresponding judgment results (can be also symbolized by the automatic-input stamps A or the manual-input stamps M) according to the under-judged field information and the under-judged volumes of the time stamps.

For example, as shown in Form 3, the data storage device 1 is stored with 10 under-judged form data JF correspondingly assigned by serial numbers 1001~1010, and thus 10 judgment results would be generated after necessary judgments. In Form 3, the judgment results of the under-judged form data 1001, 1003 and 0005 are all the manual inputs, and thus the marking unit 232 would give the under-judged form data 1001, 1003 and 0005 the manual-input stamps M. On the other hand, the judgment results of the rest under-judged form data are the automatic inputs, and the marking unit 232 would give them the automatic-input stamps A.

Form 3: Judgment results and Stamps of Under-judged form data

| Serial No. of under-judged form data | Judgment result | Stamp |
|---|---|---|
| 1001 | Manual input | M |
| 1002 | Automatic input | A |
| 1003 | Manual input | M |
| 1004 | Automatic input | A |
| 1005 | Manual input | M |
| 1006 | Automatic input | A |
| 1007 | Automatic input | A |
| 1008 | Automatic input | A |
| 1009 | Automatic input | A |
| 1010 | Automatic input | A |

After the judgment results are stored into the data storage device 1, the judging device 2 would broadcast push signals to the data entry terminals 3a~3c, and to further have operators of the data entry terminals 3a~3c to verify if the judgment results are correct or not. In the data entry terminals 3a~3c, as soon as any error of the judgment results corresponding to the under-judged form data has been confirmed, the feedback ground truths would be input through the corresponding feedback operation interfaces 32a~32c. At this time, any individual under-judged form data corresponding to the error would be defined as an judgment-abnormal form data. In the case when the judgment result corresponding to the under-judged form data is verified to be corrected, then a corresponding judgment-correct message would be input. The feedback ground truths and the judgment-correct messages would be forwarded to the judging device 2.

The verification warning module 24 can include a verification unit 241, a warning unit 242, a verification-cycle setting interface 243 and a judgment accuracy calculation unit 244. While the judging device 2 receives the feedback ground truth, the verification unit 241 would define the corresponding under-judged form data as a judgment-abnormal form data, and further determine that the judgment result and feedback ground truth do not match. At this time, the verification unit 241 would list the feedback ground truth as the trace-back ground truth corresponding to the judgment-abnormal form data, and then the warning unit 242 would issue a judgment-abnormal alerting message.

On the other hand, after the judging device 2 receives the judgment-correct message, the verification unit 241 would define the corresponding under-judged form data as a judgment-correct form data, and determine that the judgment result matches the feedback ground truth. At this time, the verification unit 241 would list the judgment result directly as the trace-back ground truth corresponding to the judgment-correct form data. Then, verification unit 241 would transmit and further store the judgment-abnormal form data and the corresponding trace-back ground truth to the data storage device 1 as the new ground-truth form data and initial ground truth, respectively, such that the supervised learning module 22 can re-execute the learning calculation to revise the judgment calculation model.

The verification-cycle setting interface 243 can be further used to set a verification cycle. According to the verification cycle, the judgment-abnormal form data and the trace-back ground truth are periodically defined as the ground-truth form data and the initial ground truth for the supervised learning module to perform periodically the learning calculation, such that the judgment calculation model can be periodically revised. The judgment accuracy calculation unit 244 would calculate the numbers of the judgment-abnormal form data and the judgment-correct form data defined among the under-judged form data JF, such that the judgment accuracy determined in each of the verification cycles can be calculated. In this disclosure, the verification cycle can be determined according to requirements of statistic cycles, the number of form data and the like necessary for correct judgment. In this embodiment, the verification cycle can be set to a day, a week, a month or a season.

For example, following the judgment results listed in Form 3, as shown in Form 4, after the operators of the data entry terminals 3a~3c have verified the judgment results, it is found that the judgment result of the under-judged form data No. 1003 is the manual input. However, in fact, the under-judged form data No. 1003 is the automatic input. Thus, one of the feedback operation interfaces 32a~32c can be utilized to input correspondingly the feedback ground truth telling the should-be "Automatic input". At this time, the verification unit 241 would define the under-judged form data No. 1003 as the judgment-abnormal form data, then list the feedback ground truth (Automatic input) to the trace-back ground truth for the judgment-abnormal form data (i.e., the under-judged form data No. 1003), and finally record this change into the data storage device 1. In addition, the warning unit 242 would issue a judgment-abnormal alerting message to alert that the judgment result upon the under-judged form data No. 1003 through the current mathematical calculus model is incorrect.

On the other hand, after the operators of the data entry terminals 3a~3c have verified the judgment results, it is found that the judgment results of the rest of the under-judged form data are all correct. Then, the feedback operation interfaces 32a~32c can be used to input the judgment-correct messages. At this time, the verification unit 241 would define directly the rest of the under-judged form data as the judgment-correct form data, list the corresponding judgment results into the column of the trace-back ground truth, and finally record these changes into the data storage device 1.

In each of the verification cycles, after a plurality of the verified under-judged form data JF have been accumulated, and the corresponding trace-back ground truths have been determined, then, prior to entering the next verification cycle, part or all of the aforesaid verified under-judged form data JF (such as the judgment-abnormal form data, or both the judgment-abnormal form data and judgment-correct form data) and the corresponding trace-back ground truths would be defined as the new ground-truth form data and the corresponding initial ground truths, respectively.

Among 10 under-judged form data, the judgment accuracy calculation unit 244 determines that only one data (i.e., the under-judged form data No. 1003) is the judgment-abnormal form data, and the rest 9 under-judged form data are all the judgment-correct form data. Accordingly, the judgment accuracy calculation unit 244 would calculate that, in this verification cycle, the judgment accuracy for the judgment system 100 to determine the under-judged form data JF to be the manual inputs or the automatic inputs is 90%. At the same time, the judgment accuracy calculation unit 244 can also calculate a form-data automation rate of this instant verification cycle. In Form 4 showing results of the trace-back ground truths, it is found that, in this verification cycle, 8 automatic inputs and 2 manual inputs are included. Namely, the form-data automation rate of this instant verification cycle is 80%.

| Form 4: Verification of Judgment Results | | | | |
|---|---|---|---|---|
| Serial No. of under-judged form data | Judgment result | Feedback ground truth | Trace-back ground truth | Correctness of judgment |
| 1001 | Manual input | — | Manual input | Correct |
| 1002 | Automatic input | — | Automatic input | Correct |
| 1003 | Manual input | Automatic input | Automatic input | False |
| 1004 | Automatic input | — | Automatic input | Correct |
| 1005 | Manual input | — | Manual input | Correct |
| 1006 | Automatic input | — | Automatic input | Correct |
| 1007 | Automatic input | — | Automatic input | Correct |
| 1008 | Automatic input | — | Automatic input | Correct |
| 1009 | Automatic input | — | Automatic input | Correct |
| 1010 | Automatic input | — | Automatic input | Correct |

After experiencing steps of determination of plural verification cycles, and verification and re-execution of the learning calculation to revise the judgment calculation model, the judgment accuracy of the judgment system 100 in determining whether the under-judged form data JF is a manual input or an automatic input can be gradually improved. Till the judgment accuracy is raised up to a target accuracy (such as 99.99%), it implies that the judgment ability of the judgment system 100 has reached a certain level of confidence. Then, the verification cycle can be substantially extended, such as from one verification per season to one verification per year. In particular, the judgment result obtained by the judgment system 100 at each judgment can be directly utilized as the ground truth. Namely, no further following verification is necessary.

Further, majority of examination resources (including personnel, equipment and/or tool software, etc.) can concentrate the verification upon the manual-input form data having a manual-input stamp M (especially to those ground-truth form data GF that have been verified as the manual inputs), so as to raise effectively the entire accuracy of the form data by correcting the error in the manual-input form data. In addition, through increasing the sampling rate of the manual-input form data but decreasing that of the automatic-input form data, the entire accuracy of the form data can be effectively improved without adding the overall working load (i.e., the total requirement of examination resources).

Since all the aforesaid feature extracting module 21, supervised learning module 22, judging module 23 and verification warning module 24 are created after the judgment program JAP is executed, thus basically the feature extracting module 21, the supervised learning module 22, the judging module 23 and the verification warning module 24 can be treated as part of main programs of the judgment program JAP, subroutines thereof, or program pages or functional interfaces created after the judgment program JAP us executed. Anyone who has common knowledge in the related technical field (especially the field of artificial intelligence algorithms) can use the appropriate programming language to write the judgment program JAP (including its main program or sub-program) furnished with functions of the above-mentioned feature extracting module 21, supervised learning module 22, judging module based on the above learning and judgment logic 23 and verification warning module 24, so as to realize the above-mentioned various technologies of the present invention.

In summary, in the system for judging input mode of form data 100 provided by the present invention, through long-term observations upon the relevance and regularity between the manual-input form data and the automatic-input form data, the amount of field information and the volume of time stamps related to the time and the data chaos are particularly selected as the important feature basis for subsequent learning, training and judging. Accordingly, the supervised learning and training are used to establish the judgment calculation model with a high level of confidence in a short period of time, and to obtain the judgment results with higher judgment accuracy.

Further, by using the judging device 2 to perform periodically judgment, verification, warn and generation of the basic truth, the false judgment results can be corrected to accordingly re-execute the learning calculation so as to revise the judgment calculation model. Thereupon, advantages of automatic judging and input can be obtained, and also the judgment accuracy can be significantly improved in a short period of time. After obtaining the judgment results with a further high judgment accuracy rate, majority of examination resources (including personnel, equipment and/or tool software, etc.) can thus concentrate the verification upon the manual-input form data, such that the entire accuracy of the form data can be effectively improved.

While the present invention has been particularly shown and described with reference to a preferred embodiment, it will be understood by those skilled in the art that various changes in form and detail may be without departing from the spirit and scope of the present invention.

What is claimed is:

1. A system for judging input mode of form data, comprising:
    a data storage device, stored with a plurality of ground-truth form data and a plurality of under-judged form data, the plurality of ground-truth form data having correspondingly a plurality of initial ground truths for defining individually manual inputs or automatic inputs; and
    a judging device, communicatively connected with the data storage device for retrieving the plurality of ground-truth form data and the plurality of under-judged form data, furnished with a judgment program, the judgment program being executed to create:

a feature extracting module, configured to retrieve a study-use field information and a study-use volume of time stamp corresponding to data chaos from each of the plurality of ground-truth form data, thus the plurality of ground-truth form data having correspondingly a plurality of the study-use field information and a plurality of the study-use volumes of time stamp, and to retrieve an under-judged field information and an under-judged volume of time stamp corresponding to the data chaos from each of the plurality of under-judged form data;

a supervised learning module, configured to perform a learning calculation for generating a judgment calculation model according to the plurality of study-use field information and the plurality of study-use volumes of time stamp corresponding to the plurality of ground-truth form data and one of the plurality of initial ground truths;

a judging module, configured to judge each of the plurality of under-judged form data for generating correspondingly a judgment result for predicting whether the each of the plurality of under-judged form data is the manual input or the automatic input according to the under-judged field information and the under-judged volume of time stamp corresponding to the judgment calculation model and each of the plurality of under-judged form data, thus a plurality of the judgment results being generated; and a verification warning module, configured to receive a plurality of feedback ground truths for defining individually the plurality of under-judged form data to be the manual inputs or the automatic inputs; wherein, when one of the plurality of judgment results does not match one of the plurality of feedback ground truths in verifying one of the plurality of under-judged form data, a warning message is generated for defining a judgment-abnormal form data and a trace-back ground truth, the judgment-abnormal form data and the trace-back ground truth are stored into the data storage device as one of the plurality of ground-truth form data and one of the plurality of initial ground truths, respectively, for the supervised learning module to re-execute the learning calculation and accordingly revise the judgment calculation model.

2. The system for judging input mode of form data of claim 1, further including a plurality of data entry terminals, wherein the plurality of ground-truth form data and the plurality of under-judged form data are transmitted to the data storage device by the plurality of data entry terminals.

3. The system for judging input mode of form data of claim 2, wherein each of the plurality of data entry terminals further includes a feedback operation interface for an operator of each of the plurality of data entry terminals to input one of the plurality of feedback ground truths upon when one of the plurality of judgment results corresponding to one of the plurality of under-judged form data is verified to be false.

4. The system for judging input mode of form data of claim 3, wherein the verification warning module further includes a verification-cycle setting interface for setting a verification cycle, the judgment-abnormal form data and the corresponding trace-back ground truth are periodically defined as one of the plurality of ground-truth form data and one of the plurality of initial ground truths, respectively, according to the verification cycle, for the supervised learning module to periodically perform the learning calculation according to the verification cycle.

5. The system for judging input mode of form data of claim 4, wherein the verification warning module further includes a judgment accuracy calculation unit for counting the plurality of under-judged form data and the judgment-abnormal form data within the verification cycle, and thus a judgment accuracy is derived accordingly.

6. The system for judging input mode of form data of claim 1, wherein the data storage device is a data storage server, and the judging device is a computing server.

7. The system for judging input mode of form data of claim 1, wherein the feature extracting module further includes an information-field extracting unit, the information-field extracting unit utilizes a field entropy algorithm to calculate the study-use field information and the under-judged field information, the field entropy algorithm is $-\Sigma_{i-1}^{k} p_i \log p_i$, $p_i=(a_i)/(\Sigma_{i=1}^{k} a_i)$, k stands for a number of data field types, $a_i$ stands for the i-th data field type among the k data field types, and i, k and $a_i$ are all natural numbers.

8. The system for judging input mode of form data of claim 1, wherein the feature extracting module further includes a time-stamp extracting unit for an operator, the time-stamp extracting unit is configured for an operator to indicate q time-stamp fields among p fields and to retrieve the study-use volume of time stamp and the under-judged volume of time stamp according to a time-stamp-volume algorithm, the time-stamp-volume algorithm is $\text{Max}_{1 \leq j \leq q}(v_j)$, $v_j$ stands for a number of different data content types included in r data columns corresponding to the j-th time-stamp field among the q time-stamp fields, j, $v_j$, p, q and r are all natural numbers, and p>q.

9. The system for judging input mode of form data of claim 1, wherein the judging module further includes a marking unit, the marking unit gives an automatic-input stamp or a manual-input stamp to each of the plurality of under-judged form data according to the corresponding judgment result, and the automatic-input stamp or the manual-input stamp is stored into the data storage device.

10. The system for judging input mode of form data of claim 1, wherein the learning calculation executed by the supervised learning module includes at least one basic training algorithm and at least one fitting algorithm, the at least one basic training algorithm includes at least of a K nearest neighbors algorithm (KNN), a support vector machine (SVM) algorithm, a decision tree algorithm and a regression algorithm, and the at least one fitting algorithm includes at least a random forest algorithm and an extreme gradient boosting (XGBoost) algorithm.

* * * * *